US009983613B2

(12) United States Patent
Divan et al.
(10) Patent No.: US 9,983,613 B2
(45) Date of Patent: *May 29, 2018

(54) METHODS AND SYSTEMS OF NETWORK VOLTAGE REGULATING TRANSFORMERS

(71) Applicant: VARENTEC, INC., Santa Clara, CA (US)

(72) Inventors: Deepakraj M. Divan, San Jose, CA (US); Anish Prasai, San Jose, CA (US)

(73) Assignee: Varentec, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/456,406

(22) Filed: Mar. 10, 2017

(65) Prior Publication Data

US 2017/0235323 A1 Aug. 17, 2017

Related U.S. Application Data

(63) Continuation of application No. 14/055,814, filed on Oct. 16, 2013, now Pat. No. 9,639,104.

(60) Provisional application No. 61/714,725, filed on Oct. 16, 2012.

(51) Int. Cl.
*G05F 1/70* (2006.01)
*H02M 1/42* (2007.01)

(52) U.S. Cl.
CPC .................................... *G05F 1/70* (2013.01)

(58) Field of Classification Search
CPC ............ H02M 1/4208; H02M 1/4216; H02M 1/4233; H02M 1/42; G05F 1/70; Y02E 40/30; Y02E 40/34
See application file for complete search history.

(56) References Cited

U.S. PATENT DOCUMENTS

| | | | | |
|---|---|---|---|---|
| 3,959,719 | A | 5/1976 | Espelage | |
| 5,670,864 | A | 9/1997 | Marx | |
| 5,798,634 | A * | 8/1998 | Terada | H02J 3/14 323/207 |
| 5,841,267 | A | 11/1998 | Larsen | |
| 6,114,841 | A * | 9/2000 | Hasler | H02J 3/1864 323/207 |
| 8,781,756 | B2 | 7/2014 | Lamontagne | |
| 2010/0085004 | A1 | 4/2010 | Bell | |
| 2011/0309683 | A1 | 12/2011 | Nielsen | |
| 2013/0307494 | A1 * | 11/2013 | Meinecke | H02J 3/1878 323/205 |
| 2015/0286227 | A1 | 10/2015 | Watanabe et al. | |

* cited by examiner

*Primary Examiner* — Gary L Laxton
(74) *Attorney, Agent, or Firm* — Sheppard Mullin Richter & Hampton

(57) ABSTRACT

Methods and systems of network voltage regulating transformers are provided. A network voltage regulating transformer (NVRT) may provide voltage transformation, isolation, and regulation. A NVRT may further provide power factor corrections. Multiple NVRTs may operate autonomously and collectively thereby achieving an edge of network voltage control when installed to a power system. A NVRT comprises a transformer, a VAR source, and a control module. The input current (i.e., the current through the primary side of the transformer), the output current (i.e., the current through the secondary side of the transformer), and/or the output voltage (i.e., the voltage across the secondary side of the transformer) may be monitored.

20 Claims, 9 Drawing Sheets

METHODS AND SYSTEMS OF NETWORK VOLTAGE REGULATING TRANSFORMERS

CROSS-REFERENCE TO RELATED APPLICATIONS

The present application is a continuation of U.S. patent application Ser. No. 14/055,814, filed on Oct. 16, 2013, entitled "Methods and Systems of Network Voltage Regulating Transformers," which claims benefit of U.S. Provisional Patent Application No. 61/714,725, filed on Oct. 16, 2012, entitled "Network Voltage Regulating Transformers," the contents of which are incorporated by reference herein.

BACKGROUND

1. Field of the Invention(s)

The present invention(s) generally relate to power distribution grid network optimization strategies. More particularly, the invention(s) relate to systems and methods of network voltage regulating transformers.

2. Description of Related Art

The conventional approach to power distribution grid voltage control is based on techniques developed about 70 years ago. In recent years, highly complex and expensive systems have been required to implement improved effective voltage control and conservation voltage reduction (CVR) based demand reduction. Under present requirements, alternating current (AC) line voltage for connected users needs to fall within a narrow band specified by ANSI C84.1 under all conditions of loading and substation voltage. Typically, utilities operate in a narrow band of 116-124 volts, even though level 'A' service allows for a range of 114-126 volts. The difficulty in adhering to a tight regulation band arises from normal fluctuations in incoming line voltage at the substation, as well as load changes along the feeder. These changes cause the line voltage to vary, with utilities required to maintain voltage for consumers within specified bounds.

The prior art volt-ampere reactive regulation devices (VAR devices) for voltage control may be split into several categories including: 1) prior art VAR devices with slow responding capacitors and electro-mechanical switches; ii) prior art VAR devices with medium response capacitors and thyristor switched capacitors; and iii) prior art VAR devices with power converter based VAR control using Static VAR sources or static synchronous condensers (STATCOMs).

It should be noted that capacitors in the prior art VAR devices are mainly used for power factor control when used by customers and for voltage control when used by utilities. For power factor control, the downstream line current must be measured. Capacitors and/or inductors may be switched on or off based on the line current to realize a desired overall power factor (e.g., typically at a value of unity). In the second case of voltage control used by utilities, capacitors are controlled based on: 1) local voltage measurements; 2) other parameters such as temperature; 3) line reactive current; and/or 4) dispatches communicatively received from a control center. The control center may dispatch decisions regarding capacitor control based on information received from multiple points in the network.

Most capacitors of prior art VAR devices are switched using electromechanical switches. The electromechanical switches are limited in switching speed and by life of the switches. Many electromechanical switches are limited to 3-4 switches per day. A response time of approximately fifteen minutes is often required to enable voltage control with prior art VAR devices. During this time, the following steps may be performed: 1) sensing voltages locally; 2) communicating the sensed voltages to a centralized control center; 3) power and/or voltage modeling of the system at the centralized control center; 4) determining to take action based on the model and perceived potential improvements; and 5) dispatching one or more commands from the centralized control center to the prior art VAR device to switch the capacitor. More advanced Volt-VAR Optimization or VVO systems are moving to such centralized implementations so they can try to optimize the profile of voltage along an entire distribution feeder and reduce infighting between prior art VAR devices.

SUMMARY OF THE INVENTION

Methods and systems of network voltage regulating transformers are provided. Various embodiments may provide voltage transformation, isolation, and regulation. Further embodiments may provide power factor corrections. Multiple embodiments may operate autonomously and collectively thereby achieving an edge of network voltage control.

In one embodiment, a network voltage regulating transformer comprises a transformer, a VAR source, and a control module. Various embodiments may measure and/or monitor the input current (i.e., the current through the primary side of the transformer), the output current (i.e., the current through the secondary side of the transformer), and/or the output voltage (i.e., the voltage across the secondary side of the transformer). Various embodiments may provide voltage regulation by regulating the VAR source to provide various amount of reactive power.

DETAILED DESCRIPTION OF THE INVENTION

New requirements for distribution dynamic voltage control are emerging, driven by distribution renewable energy penetration and the need to increase grid capacity without building new lines or infrastructure. Applications such as Conservation Voltage Reduction (CVR) and Volt VAR Optimization (VVO) promise 3-5% increase in system capacity, simply by lowering and flattening the voltage profile along a distribution grid. To achieve CVR and VVO in the prior art, improvements to the power grid are slow in operation, difficult to model due to increased complexity of the overall system, require considerable back end infrastructure (e.g., modeling, and a centralized, computation and communication facility), are expensive to install in sufficient numbers to improve performance, and difficult to maintain. Further, conventional VVO schemes realize poor voltage regulation due to few control elements and poor granular response.

In various embodiments discussed herein, line voltage may be regulated at or near a location where a conventional distribution transformer is installed. Various embodiments may detect a voltage proximate to the device and make a determination to regulate a VAR source thereby providing a voltage and/or power factor control on the network. Multiple embodiments installed on the grid operate independently yet still collectively to flatten the voltage curve (e.g., voltage impact along a medium voltage distribution feeder starting from a substation) along the distribution grid.

Various embodiments provide a solution that is able to act autonomously on local information with little to no infighting. This approach may remove uncertainty about the voltage variations at a range of nodes, flatten the voltage profile along the edge of the network, and allow a Load Tap Changer (LTC) to drop the voltage to the lowest level possible. Without a central control, fighting among various embodiments is prevented, while allowing connected points to reach a desired voltage set point with much higher granularity and accuracy.

The utility may realize several benefits provided by various embodiments of the present application. For example, a desired voltage profile may be maintained optimally along the line even as system configuration changes, system losses may decrease, and/or system stability and reliability may be improved. New cascading grid failure mechanisms, such as Fault Induced Delayed Voltage Recovery (FIDVR) may also be avoided through the availability of distributed dynamically controllable VARs.

Figure 1:
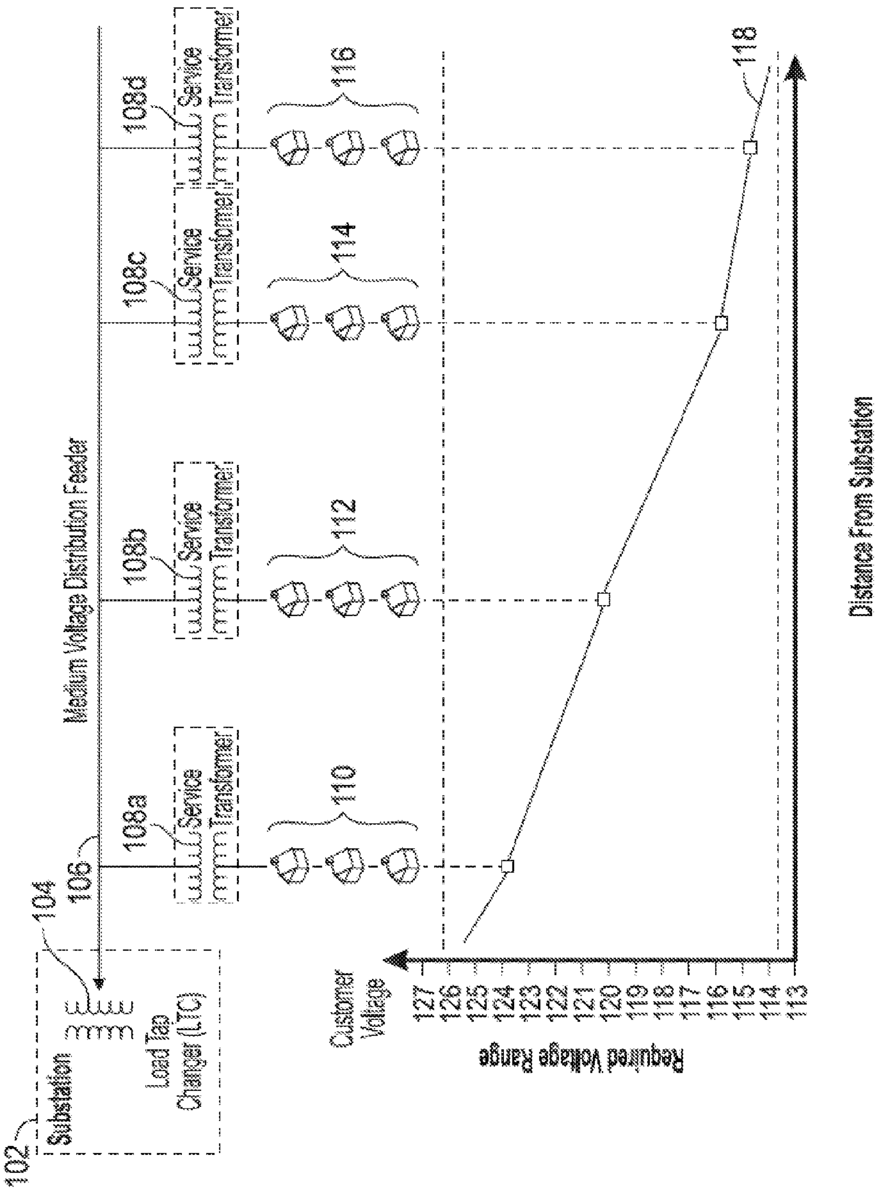
FIG. 1 (Prior Art)
FIG. 1 depicts a prior art distribution feeder fed from a single substation.

FIG. 1 depicts a prior art distribution feeder 106 fed from a single substation 102. Standard design practice involves the use of load tap changing (LTC) transformers 104 at substations 102, with fixed and switchable medium voltage capacitors on the feeder. FIG. 1 depicts a series of houses (i.e., loads) 110, 112, 114, and 116 that receive power from various distribution feeders coupled to the primary feeder 106 (e.g., distribution feeders separated from the primary feeder by transformers 108*a-d*). As illustrated, as the distance from the substation 102 increases, utility voltage 118 along the primary feeder (e.g., medium voltage distribution feeder 106) decreases.

Load tap changers, slow acting capacitor banks, and line voltage regulators may be sporadically placed along one or more primary feeders 106 to improve voltage range. Without Conservation Voltage Reduction or CVR, the first houses 110 have a required utility voltage of approximately 124.2 volts. Houses 112 have a significantly reduced utility voltage of approximate 120-121 volts. Houses 114 further have a required voltage between 115 and 116 while houses 116 have a required voltage between 114 and 115.

Figure 2:
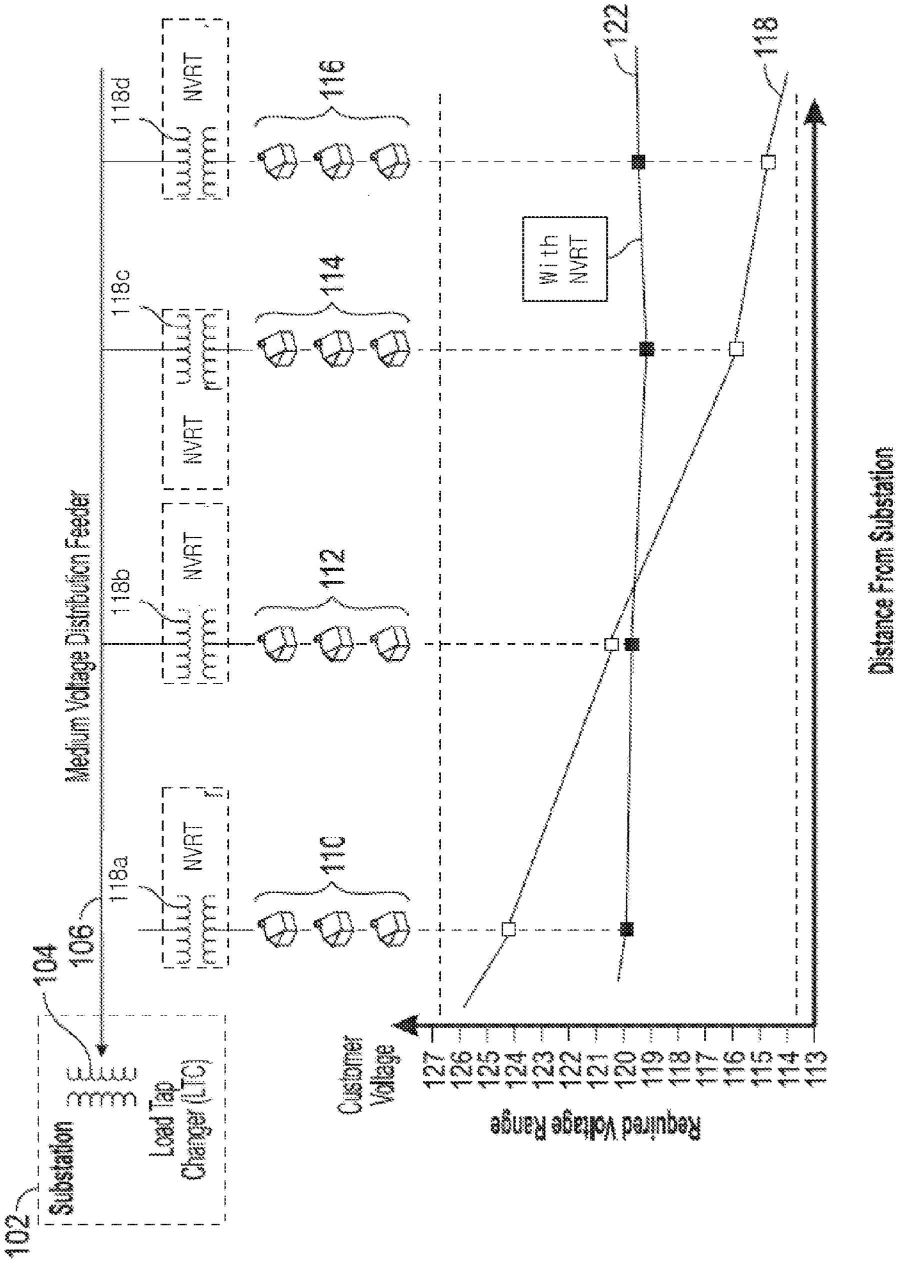
FIG. 2 depicts a distribution feeder fed from a single substation and including a plurality of NVRTs in some embodiments.

FIG. 2 depicts a distribution feeder 106 fed from a single substation 102 and including a plurality of NVRTs 118*a-d* in some embodiments. Compared with FIG. 1A, the NVRTs 118*a-d* are installed where the distribution transformers 108*a-d* are installed. As a result, the overall voltage range may be flattened along the distance from the substation 102 thereby saving energy, increasing responsiveness, and improving overall control along longer distribution feeders. In order to avoid infighting between one or more NVRTs, the action of switching (e.g., the timing of switching or the point at which voltage regulation is engaged/disengaged) may be different between all or a portion of the NVRTs.

Each NVRT may act (e.g., activate or deactivate one or more VAR sources such as a capacitor and/or inductor) quickly and independently, based at least on voltages proximate to the NVRT, respectively, to improve voltage regulation and achieve Edge of Network Volt Optimization (ENVO) (see voltage profile 122). The voltage profile 122 depicts that the voltage required for houses 110 is approximately 120 volts. Houses 112, 114, and 116, may require a reasonably flat voltage range around approximately 120 volts as well. Those skilled in the art will appreciate that the voltage line 122 achieves a desired flattening of the required voltage range while the line indicating utility voltage 118 without VAR compensation drops precipitously.

Poor controllability of preexisting voltage regulation devices presents severe challenges to managing voltage variations for system planners and operators. In particular, poor controllability limits the length of a distribution feeder that can be managed. Poor controllability also limits the load variability that can be handled, while keeping all voltages at end-user locations within bounds.

Further, new trends are seeing an increased use of sectionalizers with breaker/reclosers to isolate faulted segments and to restore power to other non-faulted line segments, resulting in a significant change in the network, and voltage profiles. Increased use of network reconfiguration also makes the task of placing capacitor banks and LTCs at fixed locations more problematic, as the placement has to meet the needs of multiple configurations. Moreover, the increasing use of distributed generation resources, such as roof top photovoltaic (PV) arrays can result in a reversal of power flows locally, with higher line voltages farther away from the substation, and a breakdown of any voltage regulation algorithm that was implemented.

Those skilled in the art will appreciate that NVRTs may individually react and correct for higher line voltages that may be a result of PV arrays (e.g., green energy improvement such as solar panels). These VAR sources may allow both the customer and the network to enjoy the benefits of green power without significantly redesigning or altering the grid to accommodate the change. Since the voltage along the edge of the network can change due to a multitude of sources and loads that are distributed along the network, a centralized algorithm, containing a complete state of the grid including all variables that affect load and input, for slow voltage control and regulation may not be effective, and with proper operation of a distributed autonomous control algorithm, may also become unnecessary.

Figure 3:
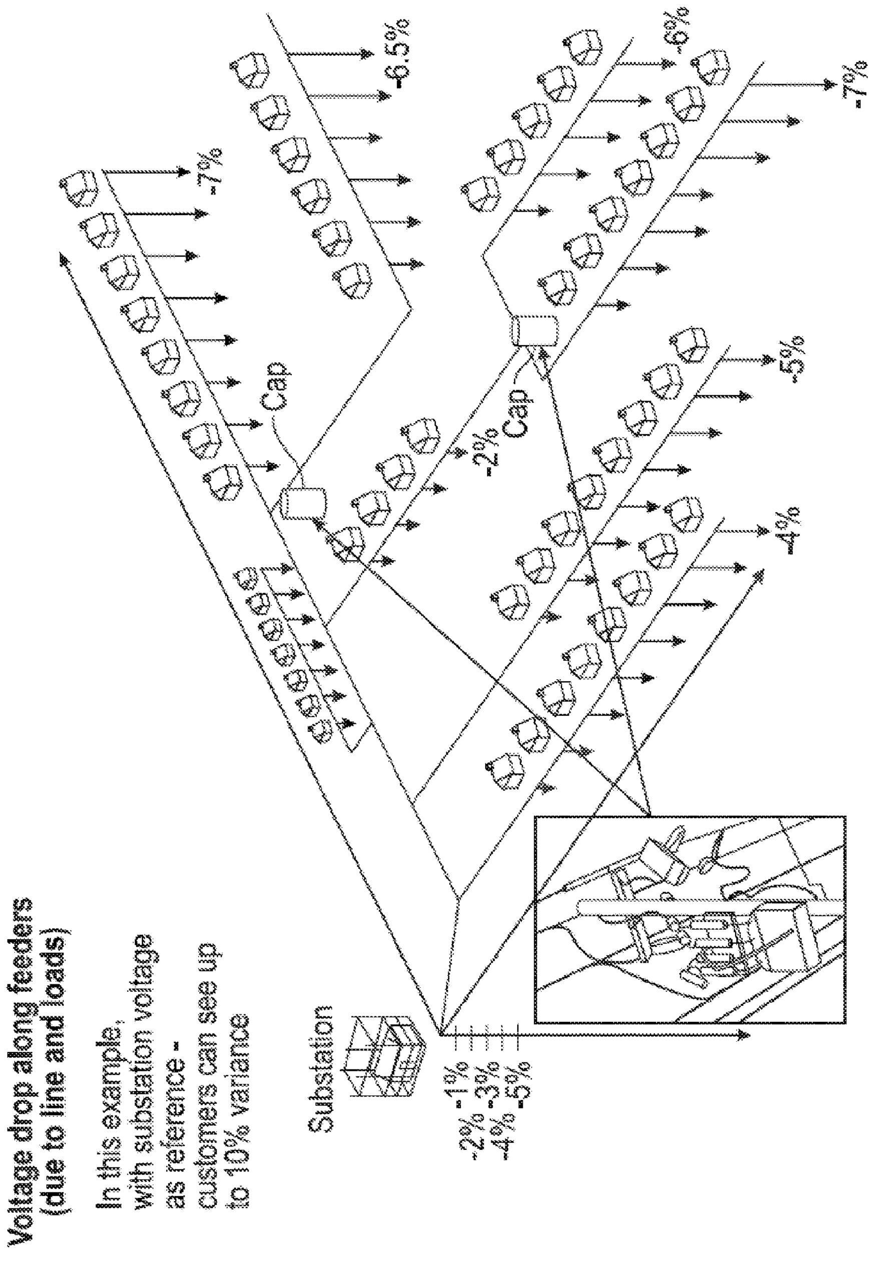
FIG. 3 (Prior Art)
FIG. 3 is a diagram depicting voltage drop along feeders due to loads without the implementation of capacitor banks in the prior art.

FIG. 3 is a diagram depicting voltage drop along feeders due to loads without the implementation of capacitor banks in the prior art. As depicted in FIG. 2, the length of the feeder lines from the substation is limited by the voltage drop. In this example, there is a 10% variance in available voltage. In the prior art, the objective is to keep voltage within a broad band. As few control handles are available, only very course control is possible. Ideally, the voltage should be closely regulated to specifications all along the line, including in the presence of dynamic fluctuations. With few sensors, few correction points, slow communication, and a limited number of operations, prior art control is unable to meet the dynamic control requirements of the new and future distribution power grid.

By utilizing sporadically placed capacitor banks, voltage regulation may be implemented to flatten the available voltage range and reduce losses. Nevertheless, to avoid interactions and to maximize switch life of the capacitor banks, switching to activate or deactivate one or more capacitors is infrequent and slow. Capacitor banks that are operated under the control a centralized facility may be individually commanded to avoid interactions.

In spite of the attempts of controlling voltage through CVR, drops along the length of the feeder are only marginally affected by the activation of the capacitor banks. In these examples, the capacitor bank may typically be switched only three-to-four times per day. The process may be slow as well. In one example, it may take up to fifteen minutes to: 1) detect conditions; 2) provide the conditions to a centralized facility; 3) the centralized facility model conditions and make a determination to enable or disable a capacitor bank; 4) provide a command to one or more capacitor banks; and 5) receive the command and perform the switching.

Further, multiple thyristor switched capacitors, if operating independently, may fight with each other as each device attempts to compensate for a locally measured state of the power network. As the thyristor switched capacitors work at cross purposes, they tend to overcompensate and undercompensate while constantly reacting to the corrections of other thyristor switched capacitors on the power network. The traditional approach of autonomous VAR control to prevent infighting is to use of voltage droop techniques. The use of voltage droop, however, counteracts the objective of CVR which is to maintain a flat and reduced voltage at every load point. As a result, precise and rapid control of voltage at multiple points along the grid cannot be obtained with conventional techniques.

Figure 4:
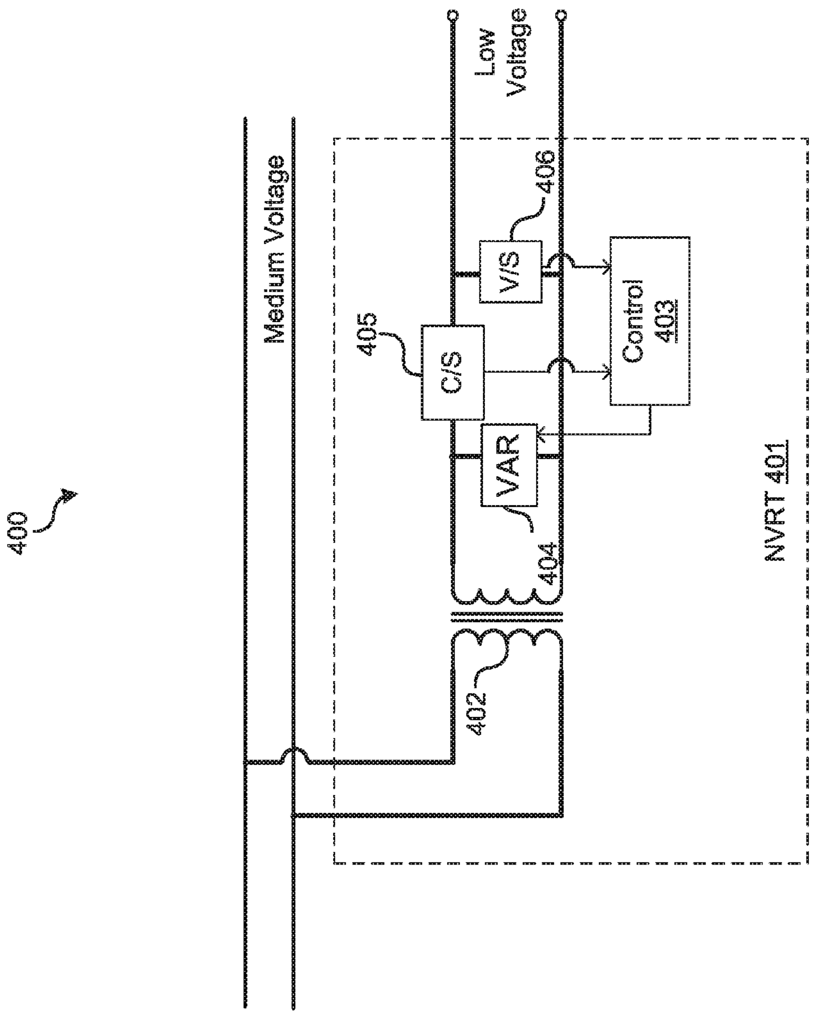
FIG. 4 illustrates an exemplary network voltage regulating transformer in accordance with an embodiment of the present application.

FIG. 4 illustrates an exemplary network voltage regulating transformer in accordance with an embodiment of the present application. In one embodiment, a network voltage regulating transformer 401 comprises a transformer 402, a control module 403, and a VAR source 404. In one embodiment, the VAR source 404 may be a capacitor. In another embodiment, the VAR source 404 may be an inductor and a capacitor connected in parallel. A set of switched capacitors and/or inductors may be integrated into a single unit. The unit may be further integrated with the transformer 402. The transformer 402 may be pole-mount or pad-mount. The VAR source is shunt connected on the secondary side (i.e., the low voltage side) of the transformer 402.

The NVRT 401 may be installed at a location where a distribution transformer is installed. The transformer 402 may perform voltage transformation, that is, stepping down voltages from the medium voltage to the low voltage side. The NVRT 401 may further provide voltage isolation between the medium voltage and the low voltage. The NVRT 401 may further comprise a current sensor 405, and a voltage sensor 406. The current sensor 405 may measure the output current (i.e., the current of the secondary side) of the NVRT 401. The voltage sensor 406 may measure the output voltage (i.e., the voltage across the secondary side) of the NVRT 401.

Moreover, the NVRT 401 may regulate voltages. In various embodiments, the controller 403 may provide shunt VAR control, that is, the reactive power inserted by NVRT 401. In particular, the reactive power injected by the VAR source 404. The NVRT 401 may include a set of voltage set points based on which the regulation of the VAR source 402 is determined. A set point may be a predetermined value to improve voltage regulation. The set of voltage set points may track the desired "ideal" voltage (e.g., 240 volts). The NVRT 401 regulates the VAR source 402 thereby controlling the reactive power. This regulation may be performed based on the comparison of a measured line voltage to the set of voltage set points. For example, the controller 403 may compare the measured voltage provided by the voltage sensor 406 to a set of voltage set points to determine the amount of reactive power needed to regulate the voltage to a predetermined value or maintain the voltage to a predetermined range. For example, if the detected voltage is lower than a previously received set point, the NVRT may operate the VAR source 404 as if a capacitor is connected to increase voltage. Alternately, if the voltage is higher than a previously received set point, the switch-controlled VAR source may operate the VAR source 404 as if an inductor is connected or a capacitor is disconnected in order to reduce voltage. In some embodiments, the set of voltage set points may be updated.

An NVRT 401 may both receive and provide information. An NVRT 401 may comprise a communication module (not shown), which may communicate with a central controller or a distributed controller, such as by transmitting local measurements, receiving instructions, etc. The communication module may be based on various communication standards such as cellular network and zigbee. The NVRT 401 may communicate via a cellular network, power line carrier network (e.g., via the power grid), wirelessly, via near-field communications technology, or the like. As such, an NVRT may receive data from a central or distributed controller, and/or to send diagnostic and other measurements to the central or distributed controller. A central or distributed controller may update the entire set or a subset of the voltage set points of a NVRT 401 at any rate or speed. Such update may be based on changes to the grid, power usage, or any other factors. The NVRT may determine a power quality performance that indicates the deviations of the measured voltage from the set of voltage set points. In some embodiments, the NVRT 401 may detect an impending outage and signal this information via the communication module.

Various information measured, received, or otherwise processed by an NVRT 401 may be tracked and assessed. For example, voltage and/or other power information may be tracked by an NVRT 401 or a centralized facility to determine usage rates and identify inconsistent usage. The energy usage at the NVRT 401 may be compared with usage recorded by all the meters connected downstream to identify potential energy theft. A history of expected usage may be developed and compared to updated information to identify changes that may indicate theft, failure of one or more grid components, or deteriorating equipment. In some embodiments, an NVRT 401 may provide information to monitor aging equipment. When changes to voltage or other information indicates deterioration or degradation, changes, updates, or maintenance may be planned and executed in advance of failure.

In some embodiments, the NVRT 401 may comprise a regulation profile. A regulation profile may comprise a policy that updates one or more set points based on conditions such as time, proximate conditions, or usage. If usage is likely to spike (e.g., based on the time and temperature of the day, business loads, residential loads, or proximity to electric car charging facilities), a regulation profile may adjust the set points accordingly. The set of voltage set points may be updated according to the actual usage, voltage changes, time of day, time of year, outside temperature, community needs, or any other criteria.

When installed to a power system, various embodiments may perform a shared or swarm voltage regulation function. A NVRT may regulate its local voltage according to a set of voltage set points, and multiple NVRTs may operate collectively yet each NVRT still operates autonomously. In further embodiments, the controller 403 may receive signals from a current sensor measuring the output current (i.e., the current through the secondary side of transformer 402). The controller 403 may further receive a measurement of the primary side line current. In various embodiments, a NVRT 401 may measure the loading of the transformer 402 thereby measuring the remaining capacity of the transformer 402 and determining whether the loading of the transformer 402 may be increased or decreased. The NVRT 401 may measure and track the temperature of the transformer 402. By comparing this temperature to a predetermined temperature value, a history of temperature excursions and loading level of the transformer may be recorded and used to estimate the remaining transformer life.

Figure 5:
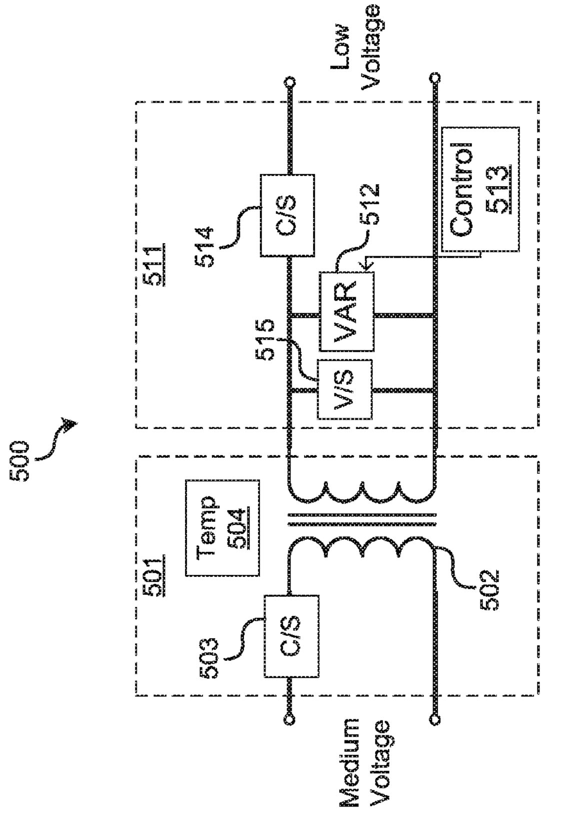
FIG. 5 illustrates an exemplary network voltage regulating transformer in accordance with an embodiment of the present application.

FIG. 5 illustrates an exemplary network voltage regulating transformer 500 in accordance with an embodiment. The illustrated network voltage regulating transformer 500 comprises a medium voltage unit 501 and a low voltage unit 511. The medium voltage unit 501 is a power unit comprising various components for voltage transformation, isolation, and regulation. The low voltage unit 511 is a control unit comprising various components that determine the operation of the network voltage regulating transformer 500. The medium voltage unit 501 and the low voltage unit 511 may be packaged in two separate housings but together may form an integrated network voltage regulating transformer. Furthermore, the low voltage unit 511 may be detached from the medium voltage unit 501 and replaced by a different low voltage unit 511'. In various embodiments, the low voltage unit 511 may be coupled to the medium voltage unit 501 via a connector (not shown) ensuring a sealed connection between the two units 501 and 511. The current sensor 501 and the temperature 504 may each include a sensing lead via a connector that is coupled to the low voltage unit 511.

In further embodiments, the current sensor 503 may be an energy harvesting current sensor. For example, the current sensor 503 may be a "clamp-on" type of current transformer that derives its power from the line current. This configuration allows energy harvesting and current measurement at the same time. The current sensor 503 may provide the current measurement (e.g., the magnitude and phase angle) to the control module 513 via a communication scheme (e.g., via a communication module).

In the illustrated example, the medium voltage unit 501 comprises a transformer 502 integrated with a current sensor 503 and a temperature sensor 504. The current sensor measures the input current to the transformer 502. The temperature sensor 504 may measure the ambient and/or the internal temperature of the transformer 502. The low voltage unit 511 comprises a VAR source 512, a control module 513, a current sensor 514, and a voltage sensor 515. The current sensor 514 and the voltage sensor 515 measure the output current and the output voltage of the network voltage regulating transformer 500, respectively. The control module 513 may regulate the VAR source according to the current measures provided by the current sensors 503 and 514, and the voltage measurement provided by the voltage sensor 515.

The transformer 502 may be oil cooled, whereas the components of the low voltage unit 511 may be cooled by fans. Furthermore, the transformer may be designed to have a life of 30 to 40 years, which is longer than the life (e.g., 10-15 years) of various components of the low voltage unit 511. By encapsulating various components that have shorter life into a housing that is different from the transformer, a network voltage regulating transformer may deliver a longer life as a failed unit may be replaced. As such, various components having different widely varying estimated life may be used together. In addition, various components (e.g., a communication module) may be upgraded (e.g., due to the communication standard change) for various reasons without impacting the entire asset.

Figure 6:
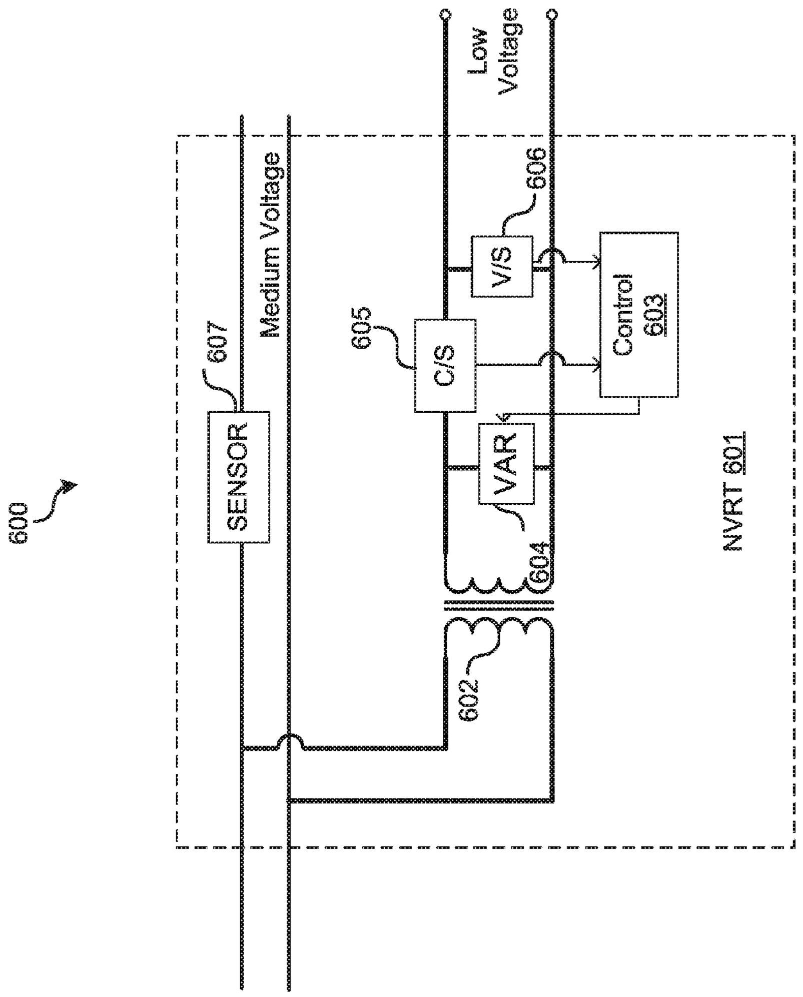
FIG. 6 illustrates an exemplary network voltage regulating transformer in accordance with an embodiment in accordance with an embodiment of the present application.

FIG. 6 illustrates an exemplary network voltage regulating transformer 601 in accordance with an embodiment of the present application. In one embodiment, a network voltage regulating transformer 601 comprises a transformer 602, a control module 603, and a VAR source 604. In one embodiment, the VAR source 604 may be a capacitor. In another embodiment, the VAR source 604 may be an inductor and a capacitor coupled in parallel. The voltage regulating transformer 601 further comprises a current sensor 607 that measures the current through the transmission line on the medium voltage side.

In addition to stepping down voltages and providing voltage isolation, the network voltage regulation transformer 601 may perform power factor correction. The current sensor 607 may communicate the measured current including the magnitude and the phase information to the control module 603. In one embodiment, the network voltage regulating transformer 601 may determine the phase information of the current through the medium voltage side such that the instant current zero crossing information is communicated between the current sensor 607 and the control module 603. The control module may estimate the phase angle thereby determining the active power and the reactive power flowing on the medium voltage side. The NVRT 600 may include a set of voltage set points and a predetermined power factor range. By comparing the measured phase information to the predetermined power factor range, the control module may regulate the VAR source 604 to provide both voltage regulation and power factor correction.

In various embodiments, the current sensor 607 may provide various information that may assist with fault location and fast restoration of the system from a fault. For example, the current sensor 607 may measure the amplitude of the overall current during a system fault and record a reversal of the current direction.

In further embodiments, the current sensor 607 may further comprise a capacitive voltage sensor. The capacitive voltage sensor may measure a line voltage of the medium voltage side. Together with the current measurement, the current sensor 607 may estimate the power factor of the medium voltage side and communicate such information to the control module 603 via a communication scheme.

One ordinary skill in the art will understand that the single-phase configurations described herein are for illustration purposes. Various embodiments may have three-phase or split single-phase configurations.

Figure 7A:
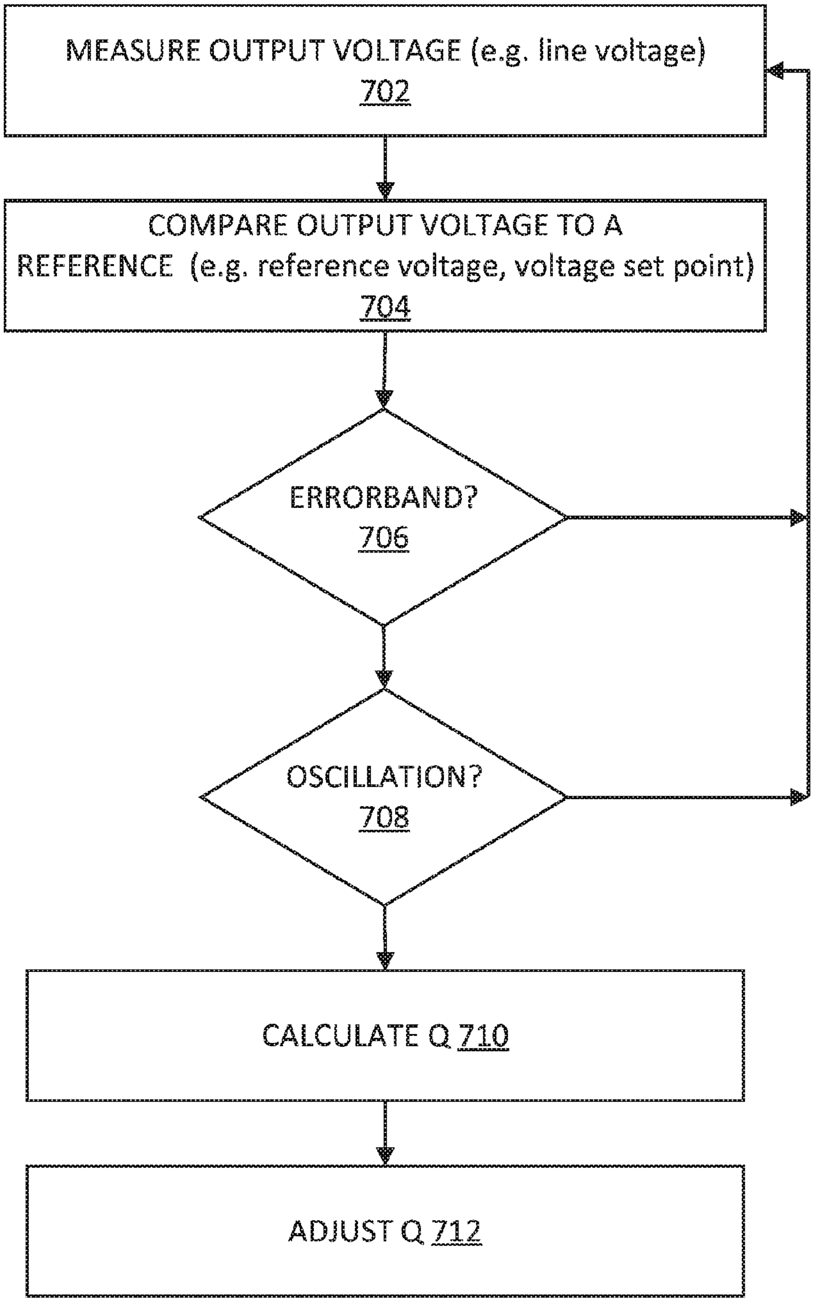
FIG. 7A illustrates an exemplary flow diagram illustrating voltage control for a network voltage regulating transformer in accordance with an embodiment of the present application.
Figure 7B:
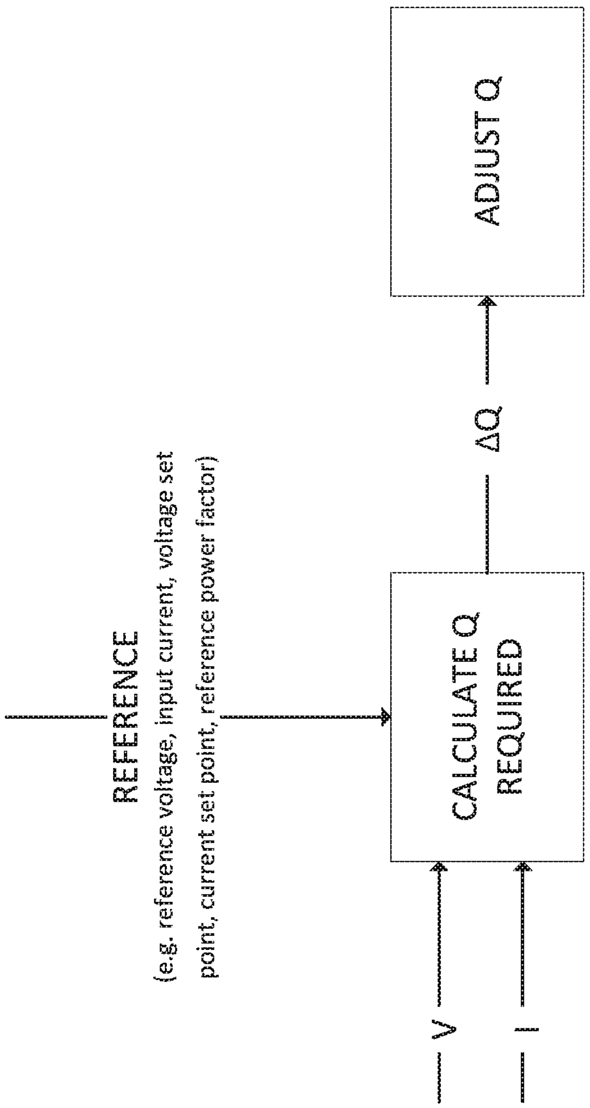
FIG. 7B illustrates an exemplary control diagram for reactive power control for a network voltage regulating transformer in accordance with an embodiment of the present application.

FIG. 7A-7B illustrate exemplary control diagrams for various operations of network voltage regulating transformers in accordance with an embodiment of the present application. Various embodiments may comprise a voltage control mode and a power factor correction control mode.

FIG. 7A illustrates an exemplary flow diagram illustrating voltage control for a network voltage regulating transformer in accordance with an embodiment of the present application. At step 702, a line voltage is measured. The line voltage may be compared to a reference voltage at step 704. The reference voltage may be one of a set of voltage set points. At step 706, whether the voltage difference between the measured voltage and the reference voltage is in the error band is determined. When the voltage difference is within the error band, it is unnecessary to adjust the voltage. Step 708 entails determining whether there is an oscillation when the voltage difference is outside the error band. At step 710, the amount of reactive power Q is determined.

In various embodiments, the desired response is determined according to Equation (1):

$$Q(t)=Q_F-(Q_F-Q_0)e^{-t/\tau}, \tag{1}$$

where $Q_F$ is the final value of reactive power required by the system from an NVRT, and $Q_0$ is the initial amount of reactive power presently being injected by the NVRT. The time constant, $\tau$, determines the rate at which the injection level is varied.

This time constant $\tau$ is based on the difference between a reference voltage and the measured voltage according to Equation (2):

$$\tau = \frac{K'_T}{|V^* - V|} \tag{2}$$

In various embodiments, the control module may be a discrete-time controller. That is, a fixed value of reactive power Q may be injected at a given time interval. In other words, the amount of change in reactive power is constrained to a fixed value. As such, large voltage swings due to a sudden change in reactive power may be eliminated. In one embodiment, the injection time interval may be updated to reflect changes in load, power sources, and the reactive power being supplied by various instruments in a power system. The variable time may be determined in accordance with Equation (3):

$$\Delta t = \frac{K_T}{|V^* - V|} \tag{3}$$

Subsequently, at step 712, the reactive power Q supplied is adjusted according to the amount being determined at step 710.

FIG. 7B illustrates an exemplary control diagram for reactive power control for a network voltage regulating transformer in accordance with an embodiment of the present application. In various embodiments, the output current and the output voltage of an NVRT are measured. The amount of reactive power needed to adjust the power factor to unity is determined. In various embodiments, the amount of reactive power adjustment may be determined to Equations (1)-(3). A VAR source may be subsequently adjusted accordingly, for example, the correct number of capacitors and/or inductors may be dispatched to bring the fundamental component of the current in phase with the line voltage. In further embodiments, the input current may be measured and used as a reference for power factor correction.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 8:
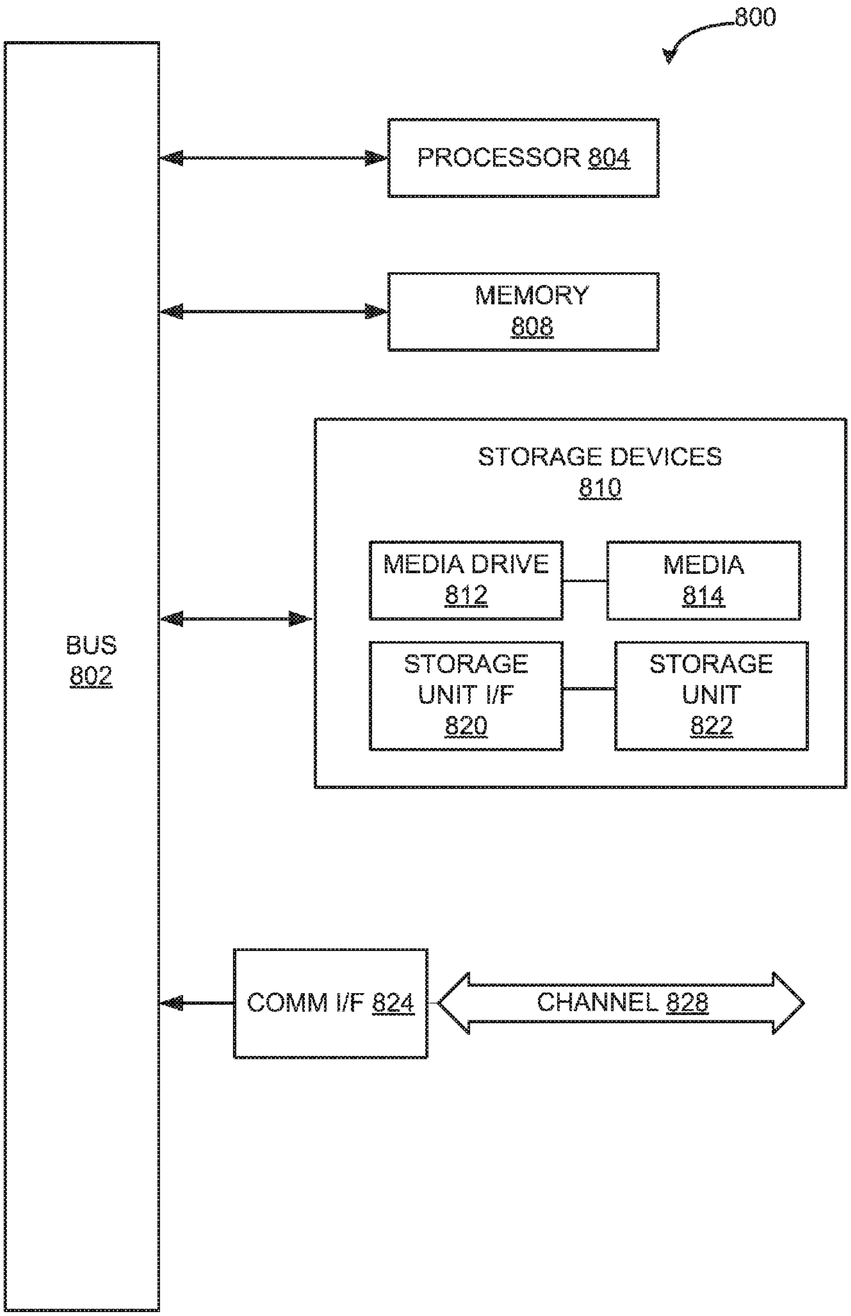
FIG. 8 illustrates an example computing module that may be used in implementing various features of embodiments of the present application.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the invention using other computing modules or architectures.

Referring now to FIG. 8, computing module 800 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 800 or to communicate externally.

Computing module 800 might also include one or more memory modules, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A system of network voltage regulating transformer (NVRT), comprising:

a transformer configured to step down voltages, the transformer having a primary side and a secondary side;

a volt-ampere reactive (VAR) source shunt-connected to the secondary side of the transformer and configured to generate reactive power;

a control module configured to regulate the reactive power generated by the VAR source according to an output of the network voltage regulating transformer; and a current sensor configured to measure an output current of the NVRT and coupled to the secondary side of the transformer.

2. The NVRT of claim 1, further comprising a voltage sensor configured to measure an output voltage of the NVRT and coupled to the secondary side of the transformer.

3. The NVRT of claim 2, wherein the control module is configured to regulate the reactive power such that the output voltage is within a predetermined range.

4. The NVRT of claim 3, wherein the control module is further configured to compare the output voltage to a reference voltage.

5. The NVRT of claim 2, wherein the control module is configured to determine a power factor according to the output voltage and the output current, and to regulate the reactive power such that the power factor is a predetermined value.

6. The NVRT of claim 5, wherein the control module is further configured to compare the power factor to a reference power factor.

7. The NVRT of claim 2, further comprising a second current sensor configured to measure an input current of the NVRT and coupled to the primary side of the transformer.

8. The NVRT of claim 7, further comprising a temperature sensor configure to measure a temperature of the transformer.

9. The NVRT of claim 8, further comprising a housing enclosing the transformer, the temperature sensor, and the second current sensor.

10. The NVRT of claim 9, further comprising a second housing enclosing the control module, the voltage sensor, the VAR source, and the first current sensor.

11. The NVRT of claim 10, wherein the second housing is different from a first housing.

12. The NVRT of claim 1, wherein the control module is further configured to measure a loading of the transformer.

13. The NVRT of claim 12, wherein the control module is configured to record a temperature of the transformer and to determine a remaining life of the transformer.

14. A system of network voltage regulating transformer (NVRT), comprising:

a transformer configured to step down voltages, the transformer having a primary side and a secondary side;

a volt-ampere reactive (VAR) source shunt-connected to the secondary side of the transformer and configured to generate reactive power;

a control module configured to regulate the reactive power generated by the VAR source according to an output of the network voltage regulating transformer;

a current sensor configured to measure an output current of the NVRT and coupled to the secondary side of the transformer; and a voltage sensor configured to measure an output voltage of the NVRT and coupled to the secondary side of the transformer.

15. The NVRT of claim 14, wherein the control module is configured to regulate the reactive power such that the output voltage is within a predetermined range.

16. The NVRT of claim 14, wherein the control module is further configured to compare the output voltage to a reference voltage.

17. The NVRT of claim 14, wherein the control module is configured to determine a power factor according to the output voltage and the output current, and to regulate the reactive power such that the power factor is a predetermined value.

18. The NVRT of claim 17, wherein the control module is further configured to compare the power factor to a reference power factor.

19. The NVRT of claim 14, wherein the control module is further configured to measure a loading of the transformer.

20. The NVRT of claim 19, wherein the control module is configured to record a temperature of the transformer and to determine a remaining life of the transformer.

* * * * *